United States Patent [19]

Ishima

[11] Patent Number: 4,590,362
[45] Date of Patent: May 20, 1986

[54] DRIVE CIRCUIT FOR TEMPERATURE CONTROL HEATER IN INK JET PRINTER

[75] Inventor: Kazumi Ishima, Kashiwa, Japan

[73] Assignee: Ricoh Company, Ltd., Tokyo, Japan

[21] Appl. No.: 601,463

[22] Filed: Apr. 18, 1984

[30] Foreign Application Priority Data

Apr. 20, 1983 [JP] Japan ................................. 58-69539
Apr. 20, 1983 [JP] Japan ................................. 58-69538

[51] Int. Cl.⁴ .............................................. H05B 1/02
[52] U.S. Cl. ................................ 219/497; 219/501; 219/216; 219/330; 346/106
[58] Field of Search ........ 219/497, 499, 501, 216 PH, 219/330; 346/106

[56] References Cited

U.S. PATENT DOCUMENTS 4,167,663  9/1979  Granzow, Jr. et al. ............ 219/497
4,459,469  7/1984  Ishima ................................ 219/330

Primary Examiner—M. H. Paschall
Attorney, Agent, or Firm—David G. Alexander

[57] ABSTRACT

A circuit for controllably driving a heater in order to speed up temperature elevation at a buildup stage of a liquid which is to be maintained at a predetermined temperature heated by the heater, particularly ink in an ink jet printer. A voltage developed by doubling an output voltage of an atmospheric temperature sensor by an amplifier is compared with a reference voltage, which is adapted to decide power to be supplied to the heater in the event of a buildup of the ink temperature. A temperature-sensitive element responsive to an atmospheric temperature has a temperature coefficient which is double the temperature coefficient of a temperature-sensitive element responsive to a heater temperature. The output voltages of the two elements are weighted by a same amount and then added together, the summation output being compared with the reference voltage.

13 Claims, 6 Drawing Figures

DRIVE CIRCUIT FOR TEMPERATURE CONTROL HEATER IN INK JET PRINTER

BACKGROUND OF THE INVENTION

The present invention relates to a heater drive circuit for controllably driving a heater to speed up a buildup temperature elevation of a liquid which is to be heated by the heater and, more particularly, to a heater drive circuit suitable for controllably driving a heater installed in an ink jet printer for controlling the temperature of ink, such that the ink temperature builds up in a short period of time.

An ink jet printer generally uses a heater for maintaining ink to be ejected from a head at an appropriate temperature and, for such a heater, various kinds of heater drive circuits have heretofore been proposed. An example of the prior art heater drive circuits is shown in FIG. 1 and generally designated by the reference numeral 10. The heater drive circuit 10 is constructed to sense an ink temperature and an atmospheric temperature, and maintains the ink temperature at a predetermined level by controlling the operation of a heater 12 based on the sensed temperatures at both the buildup and stationary stages. The heater drive circuit 10 includes a constant current circuit 14, and a series connection 20 of a temperature-sensitive element 16 responsive to heater temperature and a temperature-sensitive element 18 responsive to atmospheric temperature which is connected between the constant current circuit 14 and ground. A comparator 22 has an inverting input connecting to a junction of the constant current circuit 14 and the temperature-sensitive element 16, and a non-inverting input supplied with a first reference voltage $Vref_1$ predetermined for supplying the heater 12 with power necessary for a buildup. An error amplifier 24 has an inverting input connecting to the inverting input of the comparator 22 and a non-inverting input supplied with a second reference voltage $Vref_2$ predetermined for supplying the heater 12 with power necessary for a normal or stationary operation, which is performed to maintain the heater 12 at a predetermined temperature.

The outputs of the comparator 22 and the error amplifier 24 are connected to the heater 12 via diodes 26 and 28, respectively. Each of the temperature-sensitive elements 16 and 18 comprises a thermistor or a temperature-sensitive resistor and has a positive temperature characteristic. Assuming that the first reference voltage $Vref_1$ is preselected to control the temperature of a liquid, such as ink in an ink jet printer, to 60° C., then the comparator 22 also functions to determine whether the ink temperature has reached 60° C.

In operation, let it be assumed that the temperature of the heater 12 in the stationary operating condition is 20° C. and the atmospheric temperature is 5° C. To heat the ink quickly to 60° C., the heater 12 is controlled such that the sum of the heater temperature sensed by the element 16 and the atmospheric temperature sensed by the element 18 becomes 60° C. This will be described with reference to FIG. 2, in which the abscissa indicates the atmospheric temperature axis and the ordinate, the heater temperature axis. A solid line Ta in FIG. 2 represents atmospheric temperatures sensed by the element 18, while a dotted line $Th_1$ and a dash-and-dot line $Th_2$ individually represent temperatures of the heater 12 sensed by the element 16. Assuming that the atmospheric temperature is 20° C., the heater temperature will be controlled to become 40° C. as indicated by the atmospheric temperature Ta and the heater temperature $Th_1$. If the atmospheric temperature is 40° C., on the other hand, the heater temperature will be controlled to 20° C. as indicated by the atmospheric temperature Ta and the heater temperature $Th_1$.

Generally, in an ink jet printer, a heater for heating ink is positioned remote from a head and, therefore, ink temperature is preselected to be high enough to accommodate a temperature drop which the ink undergoes before reaching the head. This brings about a problematic situation that, because the proportion of the temperature drop of the ink decreases with the elevation of the atmospheric temperature, driving the heater 12 in the manner described above causes overshoot at a buildup of the heater 12. Meanwhile, if the first reference voltage $Vref_1$ applied to the comparator 22 is selected to be a value which does not cause overshoot at the atmospheric temperature of 10° C., the proportion of the temperature drop of the ink becomes substantial to in turn cause undershoot. It is therefore difficult to attain a fast buildup of the ink temperature. If the control is performed such that the optimum ink temperature is 40° C., difficulty will also be experienced in speeding up the buildup although no overshoot will occur.

SUMMARY OF THE INVENTION

It is therefore an object of the present invention to provide a heater drive circuit which drives a heater in a stable condition so that the temperature of a liquid to be heated by the heater may be efficiently and quickly elevated at a buildup stage and maintained at an optimum level.

It is another object of the present invention to provide a heater drive circuit which drives a heater in a stable condition so that the temperature elevation of a liquid to be heated by the heater at a buildup stage may be effectively sped up to immediately reach an optimum level without being effected by the atmospheric temperature.

It is another object of the present invention to provide a heater drive circuit which drives a heater in a stable condition so that the temperature of ink in an ink jet printer may be efficiently and quickly elevated at a buildup stage to immediately reach an optimum level without being effected by the atmospheric temperature.

It is another object of the present invention to provide a generally improved heater drive circuit.

In one aspect of the present invention, there is provided a heater drive circuit for controllably driving a heater to maintain a temperature of an object at an optimum level which comprises an atmospheric temperature sensor for sensing an atmospheric temperature, a heater temperature sensor for sensing a temperature of the heater, an amplifier having a first input supplied with an output of the atmospheric temperature sensor and a second input supplied with a predetermined and variable first reference voltage which supplies the heater with power necessary for a buildup of the heater, the amplifier having an amplification ratio larger than "1", a comparator having a first input supplied with an amplified output of the amplifier and a second input supplied with an output of the heater temperature sensor, and an error amplifier having a first input supplied with an output of the heater temperature sensor and a second input supplied with a predetermined and variable second reference voltage which supplies the heater with power necessary for a stationary operation of the heater to maintain the object at the optimum temperature.

In another aspect of the present invention, there is provided a heater drive circuit for controllably driving a heater to maintain a temperature of an object at an optimum level which comprises an atmospheric temperature sensor for sensing an atmospheric temperature and having a predetermined temperature coefficient, a heater temperature sensor for sensing a temperature of the heater and having a temperature coefficient which is larger than the temperature coefficient of the atmospheric temperature sensor, an adder for summing an output of the atmospheric temperature sensor and an output of the heater temperature sensor after weighting the outputs by a same amount, a comparator having a first input supplied with a summation output of the adder and a second input supplied with a predetermined and variable first reference voltage which supplies the heater with power necessary for a buildup of the heater, and an error amplifier having a first input supplied with a summation voltage of outputs of the atmospheric temperature sensor and the heater temperature sensor and a second input supplied with a predetermined second reference voltage which supplies the heater with power necessary for a stationary operation of the heater to maintain the object at the optimum temperature.

The above and other objects, features and advantages of the present invention will become apparent from the following detailed description taken with the accompanying drawings.

DESCRIPTION OF THE PREFERRED EMBODIMENTS

While the drive circuit for an ink temperature control heater in an ink jet printer of the present invention is susceptible of numerous physical embodiments, depending upon the environment and requirements of use, substantial numbers of the herein shown and described embodiments have been made, tested and used, and all have performed in an eminently satisfactory manner.

Figure 1:
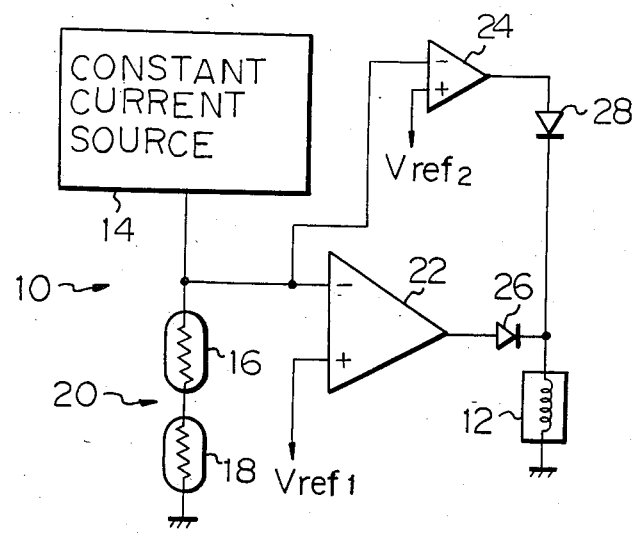
FIG. 1 is a diagram showing a prior art heater drive circuit.
Figure 2:
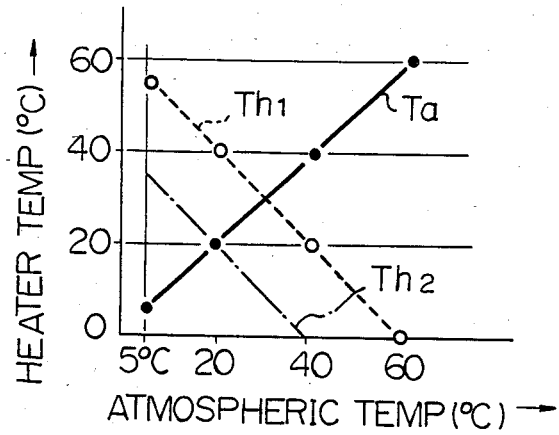
FIG. 2 is a graph representative of the operation of the heater drive circuit shown in FIG. 1.
Figure 3:
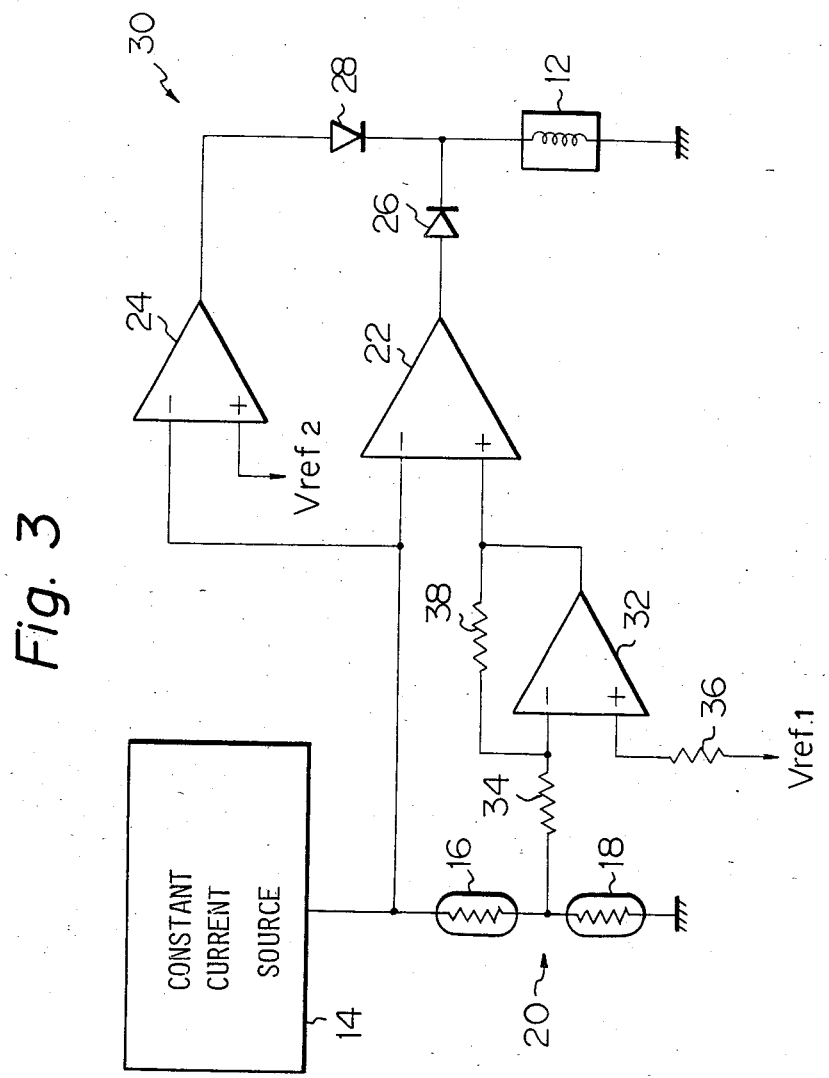
FIG. 3 is a diagram showing a heater drive circuit embodying the present invention.

Referring to FIG. 3, a heater drive circuit embodying the present invention is shown and generally designated by the reference numeral 30. In FIG. 3, the same or similar structural elements as those shown in FIG. 1 are designated by like reference numerals. The heater drive circuit 30 includes an amplifier for amplifying an output of the temperature-sensitive element 18 which is supplied to the non-inverting input of the comparator 22 of the heater drive circuit 10 shown in FIG. 1. That is, the inverting input of the amplifier 32 is connected via a resistor 34 to the junction of the temperature-sensitive elements 16 and 18 so as to be supplied with an output of the temperature sensitive-element 18, which is responsive to atmospheric temperatures. The amplification ratio of the amplifier 32 is "2". The non-inverting input of the amplifier 32 is supplied with the first reference voltage $Vref_1$ which is necessary for supplying the heater 12 with power necessary for a buildup, by way of a resistor 36. The output of the amplifier 32 is routed to the non-inverting input of the comparator 22 while being fed back to the inverting input via a resistor 38.

Figure 4:
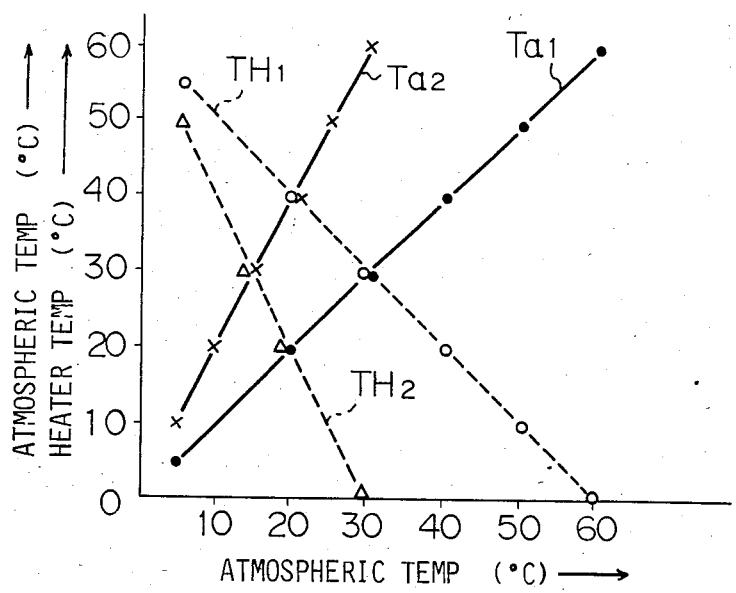
FIG. 4 is a graph representative of the operation of the heater drive circuit shown in FIG. 3 or that shown in FIG. 6.

The operation of the first embodiment will be described with reference to the graph shown in FIG. 4. In FIG. 4, the abscissa indicates an atmospheric temperature axis and the ordinate, an atmospheric temperature and heater temperature axis. A solid line $Ta_1$ represents an atmospheric temperature sensed by the element 18, a solid line $Ta_2$ an apparent atmospheric temperature produced by doubling the atmospheric temperature $Ta_1$, a dotted line $TH_1$ a heater temperature attainable with a prior art device, and a dotted line $TH_2$ a heater temperature attainable with the illustrative embodiment. All the values in FIG. 4 are shown in terms of temperature for convenience, although, properly speaking, they should be shown in terms of voltage.

Assume that the atmospheric temperature $Ta_1$ is 10° C. Then, it is doubled to make the apparent atmospheric temperature $Ta_2$ 20° C. The comparator 22 is constructed such that, when the sum of the outputs of the elements 16 and 18 has reached 60° C., its output is interrupted to stop the buildup control. Therefore, the highest temperature allowed for a buildup stage of the heater 12 is 40° C. thereby eliminating overshoot. In an extreme example, where the desired optimum ink temperature is 20° C. and the atmospheric temperature $Ta_1$ is 20° C., the heater 12 in accordance with the illustrative embodiment is controlled to keep its temperature $TH_2$ lower than 20° C. In contrast, the prior art device would allow the heater temperature to reach 40° C. as indicated by $TH_2$, resulting in overshoot.

Figure 5:
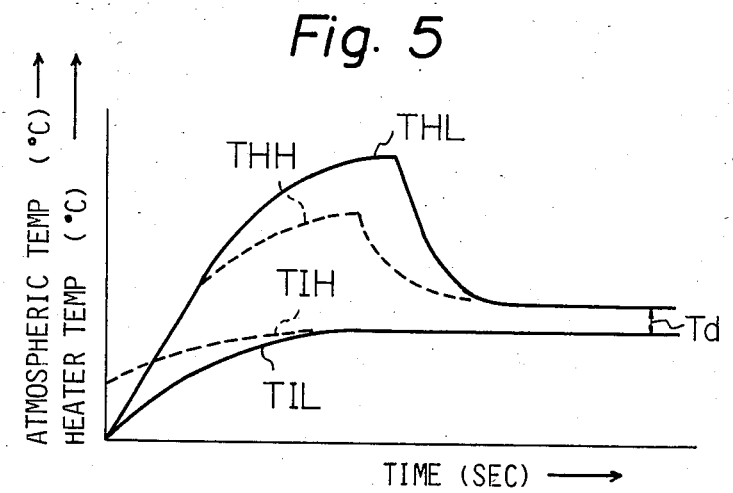
FIG. 5 is a graph indicative of a relationship between a heater temperature and an ink temperature at a buildup stage with respect to time.

In the embodiment described above, a heater temperature $TH_2$ for the atmospheric temperature $Ta_1$ of 5° C. cannot rise beyond 50° C. which is 5° C. lower than that attainable with the prior art. $TH_1 = 55°$ C. Nevertheless, such may be compensated for by increasing the reference voltage $Vref_1$ applied to the amplifier 32 by an amount matching with 5° C., or by slightly varying the gain of the amplifier 32 itself and the reference voltage $Vref_1$. In such a control, although the highest temperature allowed for a buildup is 25° C. when the atmospheric temperature $Ta_1$ is 20° C., it hardly effects the temperature of outflowing ink due to the heat capcity of the head, as shown in FIG. 5. In FIG. 5, the abscissa indicates time and the ordinate, atmospheric temperature and ink outflow temperature. A solid line THL in FIG. 5 represents buildup temperatures of the heater 12 for low atmospheric temperatures, a dotted line TIL ink outlfow temperatures for low atmospheric temperatures, a dotted line THH buildup temperatures of the heater 12 for high atmospheric temperatures, and a dotted line TIH ink outflow temperatures for high atmospheric temperatures. Further, indicated by Td is a temperature loss resulting from the distance between the heater and the head.

After the ink temperature buildup control performed as described, the error amplifier 24 sets up a normal or stationary control so that a current is allowed to flow through the heater 12 via the diode 28.

Figure 6:
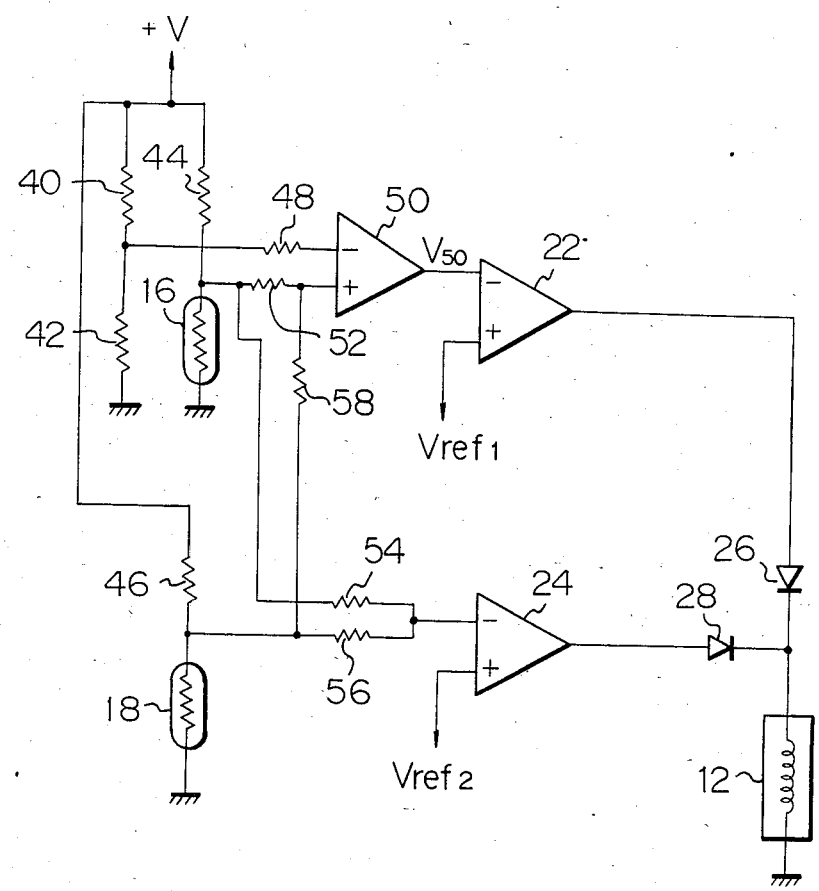
FIG. 6 is a diagram showing another embodiment of the present invention.

Referring to FIG. 6, a second embodiment of the present invention is shown. In FIG. 6, the same or similar structural elements as those shown in FIG. 3 are designated by like reference numerals. As shown, connected between a power source +V and ground are a series connection of resistors 40 and 42, a series connection of a resistor 44 and the temperature-sensitive element 16 responsive to heater temperature, and a series connection of a resistor 46 and the temperature-sensitive element 18 responsive to atmospheric temperature. The junction of the resistors 40 and 42 is connected to the inverting input of a differential amplifier 50 via a resistor 48, while the junction of the resistor 44 and the element 16 is connected to the non-inverting input of the differential amplifier 50 via a resistor 52 and to the inverting input of the error amplifier 24 via a resistor 54. The junction of the resistor 46 and the element 18 is connected to the inverting input of the error amplifier 24 via a resistor 56 and to the non-inverting input of the differential amplifier 50 via a resistor 58. The output $V_{50}$ of the differential amplifier 50 is connected to the inverting input of the comparator 22. Supplied to the non-inverting input of the comparator 22 is the first reference voltage $Vref_1$. The non-inverting input of the error amplifier 24 is supplied with the second reference voltage $Vref_2$. The outputs of the comparator 22 and error amplifier 24 are routed to the heater 12 via the diodes 26 and 28, respectively.

In the embodiment shown in FIG. 6, the resistors 40, 42, 44 and 46 are equal in resistance to each other and so are the resistors 52, 54 and 58. Assuming that the temperature coefficient of the element 16 is "1", for example, the temperature coefficient of the element 18 is predetermined to the larger than "1" and, in the illustrative embodiment, it is assumed to be "2". The resistances of the resistors 54 and 56, which are respectively associated with the temperature coefficients of the elements 16 and 18, are represented respectively by $R_{54}$ and $R_{56}$ which are in a ratio $R_{54}/R_{56}=\frac{1}{2}$. That is, an arrangement is made such that the temperature coefficients of voltages applied from the elements 16 and 18 to the error amplifier 24 are identical with each other. The differential amplifier 50 functions to weight the output voltages of the elements 16 and 18 each by "1" and serves as an adder for adding the two output voltages to each other. As shown in FIG. 4, the input to the inverting input of the error amplifier 24 represents the sum of a true heater temperature $TH_2$ and an atmospheric temperature $Ta_1$.

The heater drive circuit shown in FIG. 6 is operated as will be described hereinafter with reference to FIG. 4. In FIG. 4, the solid line $Ta_1$ represents an atmospheric temperature attained with a temperature coefficient "1" assigned to the element 18, the solid line $Ta_2$ an atmospheric temperature attained with a temperature coefficient "2" assigned to the element 18, the dotted line $TH_1$ a heater temperature in accordance with the prior art device, and the dotted line $TH_2$ a heater temperature in accordance with the second embodiment of the present invention. The temperature $Ta_2$ is an apparent value because it is assumed to be double the temperature coefficient which produces a relative temperature.

Assume that the atmospheric temperature $Ta_1$ is 20° C. Then, since the temperature coefficient of the temperature-sensitive element 18 is double the temperature coefficient of the temperature-sensitive element 16, the apparent atmospheric temperature $Ta_2$ is 40° C. and the heater temperature $TH_2$ is 20° C., causing no overshoot. As in the first embodiment, a heater temperature $TH_2$ for the atmospheric temperature of 5° C. cannot rise beyond 50° C. which is 5° C. lower than that attainable with the prior art, $TH_1=55°$ C. Nevertheless, such may be compensated for by increasing the reference voltage $Vref_1$ applied to the comparator 22 by an amount matching with 5° C.

After the ink temperature buildup control performed as described, the error amplifier 24 sets up a normal or stationary control so that a current is allowed to flow through the heater 12 via the diode 28. Since the resistances $R_{54}$ and $R_{56}$ of the resistors 54 and 56 are selected to be in a ratio $R_{54}/R_{56}=\frac{1}{2}$, the temperature coefficient of the temperature-sensitive element 18 is equivalently "1" thereby effecting an ordinary control.

In the second embodiment, it is substantially possible to precisely double the temperature coefficient of the atmospheric temperature sensor 18 and vary the second reference voltage $Vref_2$. However, so predetermining a temperature coefficient is quite difficult and adds to the cost and, in this respect, weighting by the differential amplifier 50 as in the second embodiment is more advantageous.

In summary, it will be seen that the present invention provides a heater drive circuit which speeds up temperature elevation of liquid to an optimum level at a buildup stage without any overshoot or undershoot and without being effected by the atmospheric temperature. This advantage is derived from the inherent construction in which, as described in conjunction with the first embodiment, a voltage developed by amplifying by an amplifier an output voltage of an element sensitive to an atmospheric temperature by a suitable ratio larger than "1" is compared with a predetermined reference voltage, and the supply of power to the heater is controlled in response to a result of the comparison or, as described in conjunction with the second embodiment, the temperature coefficient of the temperature sening element is made larger than that of an element sensitive to a heater temperature, outputs of the two elements are weighted by a same amount and then added, the summation output voltage is compared with a predetermined reference voltage, and the supply of power to the heater at a buildup is controlled in response to a result of the comparison.

While the embodiments have been partly described taking for example ink which is used with an ink jet printer, it will be apparent that the heater drive circuit in accordance with the present invention finds application to other various liquids whose temperatures should be controlled by a heater or even to gases or solid matters.

Various modifications will become possible for those skilled in the art after receiving the teachings of the present disclosure without departing from the scope thereof.

What is claimed is:

1. A heater drive circuit for controllably driving a heater to maintain a temperature of an object at an optimum level, comprising:
   an atmospheric temperature sensor for sensing an atmospheric temperature;
   a heater temperature sensor for sensing a temperature of the heater;
   an amplifier having a first input supplied with an output of said atmospheric temperature sensor and a second input supplied with a predetermined and variable first reference voltage, said amplifier supplying the heater with power necessary for a startup of the heater, said amplifier having an amplification ratio larger than "1";

a comparator having a first input supplied with an amplified output of said amplifier and a second input supplied with an output of the heater temperature sensor; and an error amplifier having a first input supplied with an output of the heater temperature sensor and a second input supplied with a predetermined and variable second reference voltage, said error amplifier supplying the heater with power necessary for a stationary operation of the heater to maintain the object at the optimum temperature;

outputs of said comparator and said error amplifier being connected to the heater for supplying said startup power and said stationary operating power respectively thereto.

2. A heater drive circuit as claimed in claim 1, in which the object is a liquid.

3. A heater drive circuit as claimed in claim 2, in which the liquid is ink used with an ink jet printer.

4. A heater drive circuit as claimed in claim 1, in which each of the atmospheric temperature sensor and the heater temperature sensor comprises a thermistor.

5. A heater drive circuit as claimed in claim 1, in which each of the atmospheric temperature sensor and the heater temperature sensor comprises a temperature-sensitive resistor.

6. A heater drive circuit as claimed in claim 1, in which the amplification ratio of the amplifier is "2".

7. A heater drive circuit as claimed in claim 1, in which the amplification ratio of the amplifier is adjustable.

8. A heater drive circuit for controllably driving a heater to maintain a temperature of an object at an optimum level, comprising:

an atmospheric temperature sensor for sensing an atmospheric temperature and having a predetermined temperature coefficient;

a heater temperature sensor for sensing a temperature of the heater and having a temperature coefficient which is larger than the temperature coefficient of the atmospheric temperature sensor;

an adder for summing an output of said atmospheric temperature sensor and an output of said heater temperature sensor after weighing said outputs by a same amount;

a comparator having a first input supplied with a summation output of said adder and a second input supplied with a predetermined and variable first reference voltage, said comparator supplying the heater with power necessary for a startup of the heater; and an error amplifier having a first input supplied with a summation voltage of outputs of the atmospheric temperature sensor and the heater temperature sensor and a second input supplied with a predetermined second reference voltage, said error amplifier supplying the heater with power necessary for a stationary operation of the heater to maintain the object at the optimum temperature;

outputs of said comparator and said error amplifier being connected to the heater for supplying said startup power and said stationary operating power respectively thereto.

9. A heater drive circuit as claimed in claim 8, in which the object is a liquid.

10. A heater drive circuit as claimed in claim 9, in which the liquid is ink used with an ink jet printer.

11. A heater drive circuit as claimed in claim 8, in which each of the atmospheric temperature sensor and the heater temperature sensor comprises a thermistor.

12. A heater drive circuit as claimed in claim 8, in which each of the atmospheric temperature sensor and the heater temperature sensor comprises a temperature-sensitive resistor.

13. A heater drive circuit as claimed in claim 8, in which the temperature coefficient of the heater temperature sensor is double the temperature coefficient of the atmospheric temperature sensor.

* * * * *